United States Patent
Wlodarczyk et al.

(10) Patent No.: US 11,320,565 B2
(45) Date of Patent: May 3, 2022

(54) PETROPHYSICAL FIELD EVALUATION USING SELF-ORGANIZED MAP

(71) Applicant: Schlumberger Technology Corporation, Sugar Land, TX (US)

(72) Inventors: Sylvain Wlodarczyk, Saint Clement (FR); Florent D'Halluin, Grabels (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 229 days.

(21) Appl. No.: 16/340,130

(22) PCT Filed: Oct. 13, 2016

(86) PCT No.: PCT/IB2016/001592
§ 371 (c)(1),
(2) Date: Apr. 7, 2019

(87) PCT Pub. No.: WO2018/069742
PCT Pub. Date: Apr. 19, 2018

(65) Prior Publication Data
US 2019/0243025 A1    Aug. 8, 2019

(51) Int. Cl.
| | | |
|---|---|---|
| G01V 1/20 | (2006.01) | |
| G01V 3/30 | (2006.01) | |
| G01V 99/00 | (2009.01) | |
| G01V 3/38 | (2006.01) | |

(52) U.S. Cl.
CPC .............. *G01V 99/005* (2013.01); *G01V 1/20* (2013.01); *G01V 3/38* (2013.01); *G01V 2210/61* (2013.01); *G01V 2210/614* (2013.01); *G01V 2210/66* (2013.01)

(58) Field of Classification Search
CPC .......... G01V 99/005; G01V 1/20; G01V 3/38; G01V 2210/614; G01V 2210/66; G01V 2210/61; G01V 1/16; G01V 1/00; G01V 2210/60; G01V 2210/00
See application file for complete search history.

(56) References Cited

U.S. PATENT DOCUMENTS

| | | |
|---|---|---|
| 5,848,379 A | 12/1998 | Bishop |
| 2009/0020284 A1* | 1/2009 | Graf ....................... E21B 44/00 166/250.15 |

(Continued)

FOREIGN PATENT DOCUMENTS

CN          104453875 A         3/2015

OTHER PUBLICATIONS

Peigang et al "Application of Self-organizing Neural Network to Logging Reservoir Evaluation", Geological Science and Technology Information, vol. 29 No. 3, pp. 114-118, May 31, 2010 (Abstract ONLY in English).

(Continued)

*Primary Examiner* — Mohamed Charioui

(57) ABSTRACT

A method, apparatus, and program product may evaluate a field by receiving a dataset including well measurements collected from a plurality of wells in a field, generating a synthetic dataset from the received dataset by computing a plurality of synthetic samples from the received dataset using a self-organized may (SOM), and propagating one or more models generated from the synthetic dataset to the plurality of wells.

18 Claims, 9 Drawing Sheets

(56) References Cited

U.S. PATENT DOCUMENTS

2013/0080066 A1* 3/2013 Al-Dossary ............ G01V 1/306
702/11
2013/0124171 A1* 5/2013 Schuette ................. G06F 30/20
703/2
2016/0086079 A1 3/2016 De Stefano

OTHER PUBLICATIONS

Communication pursuant to Article 94(3) EPS dated Nov. 2, 2020 for equivalent EPT Application 16809167.6.
English translation of Chinese Office Action dated Sep. 24, 2020 for equivalent CN Application 201680091512.0.
Parra, et al., "A workflow using self-organized mapping to predict rock properties from seismic reflection data," Sep. 14, 2016.
Roden, et al., "Geologic pattern recognition from seismic attributes: Principal component analysis and self-organizing maps," Interpretation, vol. 3, No. 4, Nov. 1, 2015, pp. SAE59-SAE83M.
International Search Report and Written Opinion for the equivalent International patent application PCT IB2016/001592 dated Mar. 23, 2017.
Second Chinese Examination Report dated Jul. 12, 2021 for the equivalent CN application 201680091512 (12 pages).
Communication pursuant to Article 94(3) issued in European Patent Application No. 16809167.6 dated Sep. 27, 2021, 9 pages.
Third Office Action dated Dec. 10, 2021 in counterpart Chinese patent application No. 201680091512.0.

\* cited by examiner

PETROPHYSICAL FIELD EVALUATION USING SELF-ORGANIZED MAP

BACKGROUND

Well logs and other data collected from an oilfield, or field, may be interpreted and evaluated to provide insight into formations and/or other conditions in a subsurface volume, e.g., to identify horizons defined by layers of facies and/or fractures in the subsurface, generally with a goal of identifying locations and/or amounts of recoverable hydrocarbons. In larger fields, e.g., including hundreds or thousands of wells, each with potentially tens of thousands of well measurements, the amount of collected data can be astronomical, and can complicate obtaining global views of an overall field. Furthermore, as fields continue to be developed and/or increase in size, and as the numbers of well measurements continue to rise, field evaluations become increasing more complex and difficult to undertake, particularly when well measurements must be correlated across numerous wells to ensure that a coherent global view of the field is consistent with the actual well measurements obtained from the wells in the field. Therefore, a continuing need exists in the art for a computerized manner of optimizing large datasets of well measurements to facilitate field evaluations.

SUMMARY

The embodiments disclosed herein provide a method, apparatus, and program product that evaluate a field by receiving a dataset including well measurements collected from a plurality of wells in a field, generating a synthetic dataset from the received dataset by computing a plurality of synthetic samples from the received dataset using a self-organized map (SOM), and propagating one or more models generated from the synthetic dataset to the plurality of wells.

Some embodiments also include generating the one or more models using the synthetic dataset, while some embodiments also include performing one or more petrophysical studies over the synthetic dataset, where the one or more models are generated during performance of the one or more petrophysical studies, and some embodiments also include generating one or more plots from the synthetic dataset during performance of the one or more petrophysical studies. Some embodiments also include concatenating the well measurements from the received dataset before generating the synthetic dataset, while some embodiments also include harmonizing the well measurements from the received dataset before generating the synthetic dataset. Some embodiments also include performing one or more field operations using one or more of the propagated models.

In addition, in some embodiments, propagating the one or more models includes, for each of a plurality of respective samples in the received dataset, associating a model among the one or more models with the respective sample based upon proximity distances between the respective sample and synthetic samples from the synthetic dataset.

Some embodiments may also include an apparatus including at least one processing unit and program code configured upon execution by the at least one processing unit to perform any of the methods discussed herein. Some embodiments may also include a program product including a computer readable medium and program code stored on the computer readable medium and configured upon execution by at least one processing unit to perform any of the methods discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
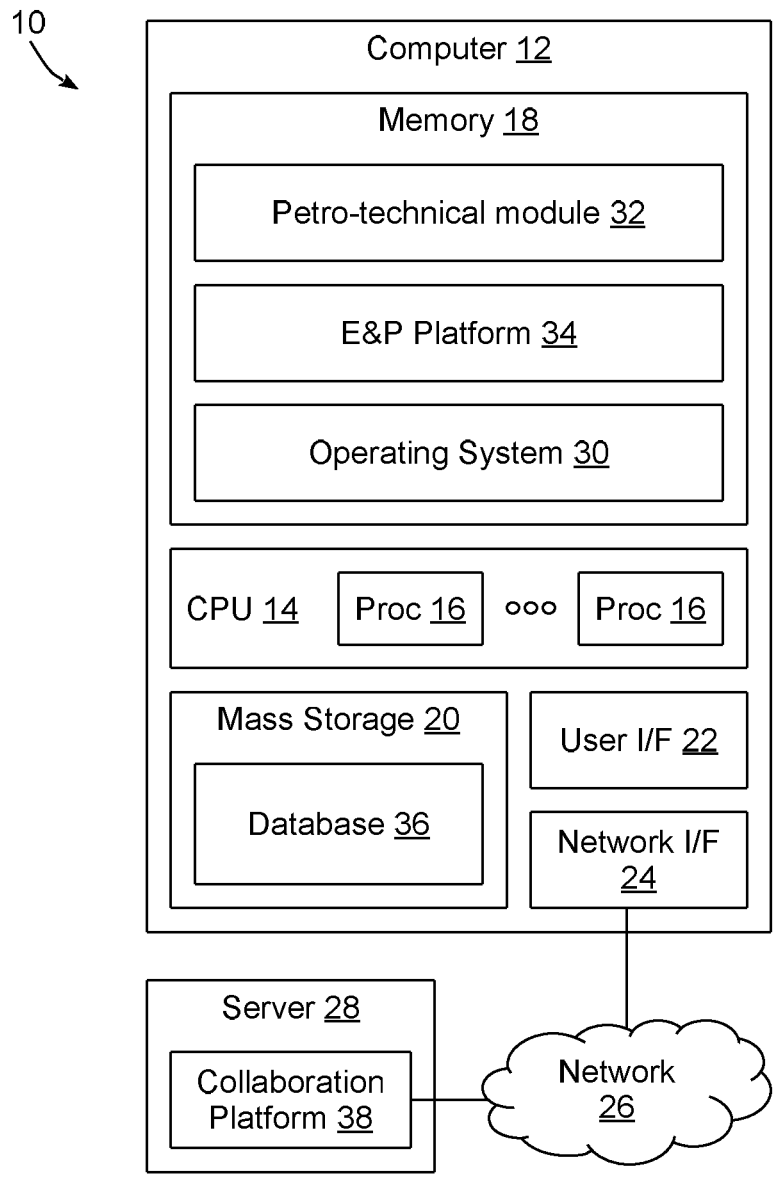
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform or the TECHLOG wellbore software platform, while collaboration platform 38 may be implemented as the STUDIO E&P KNOWLEDGE ENVIRONMENT platform, all of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
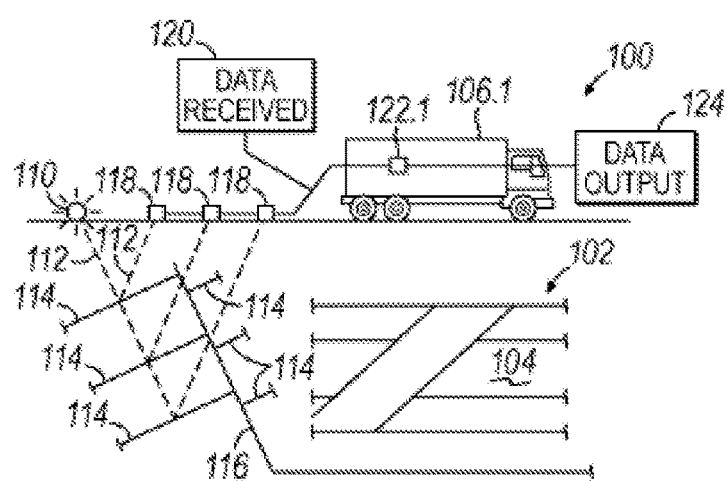
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
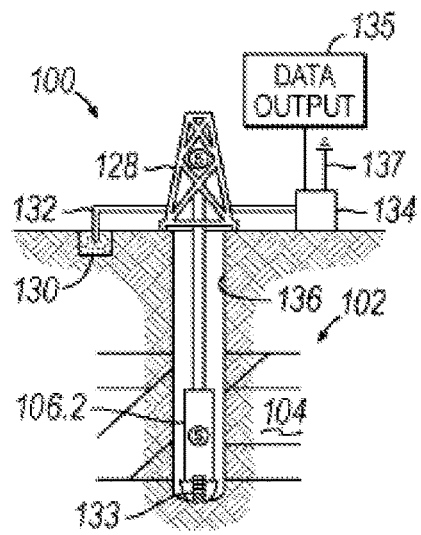

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
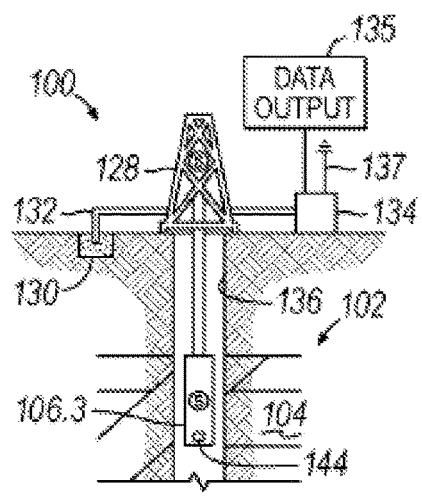

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
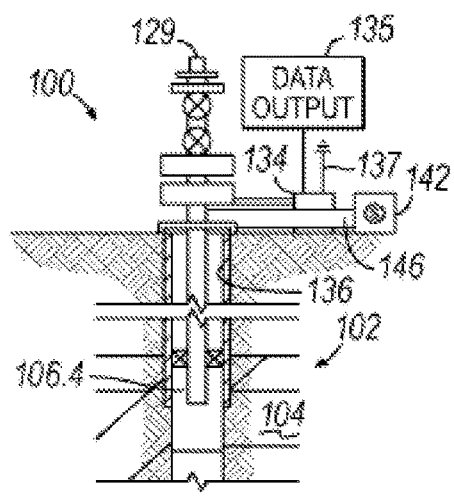

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
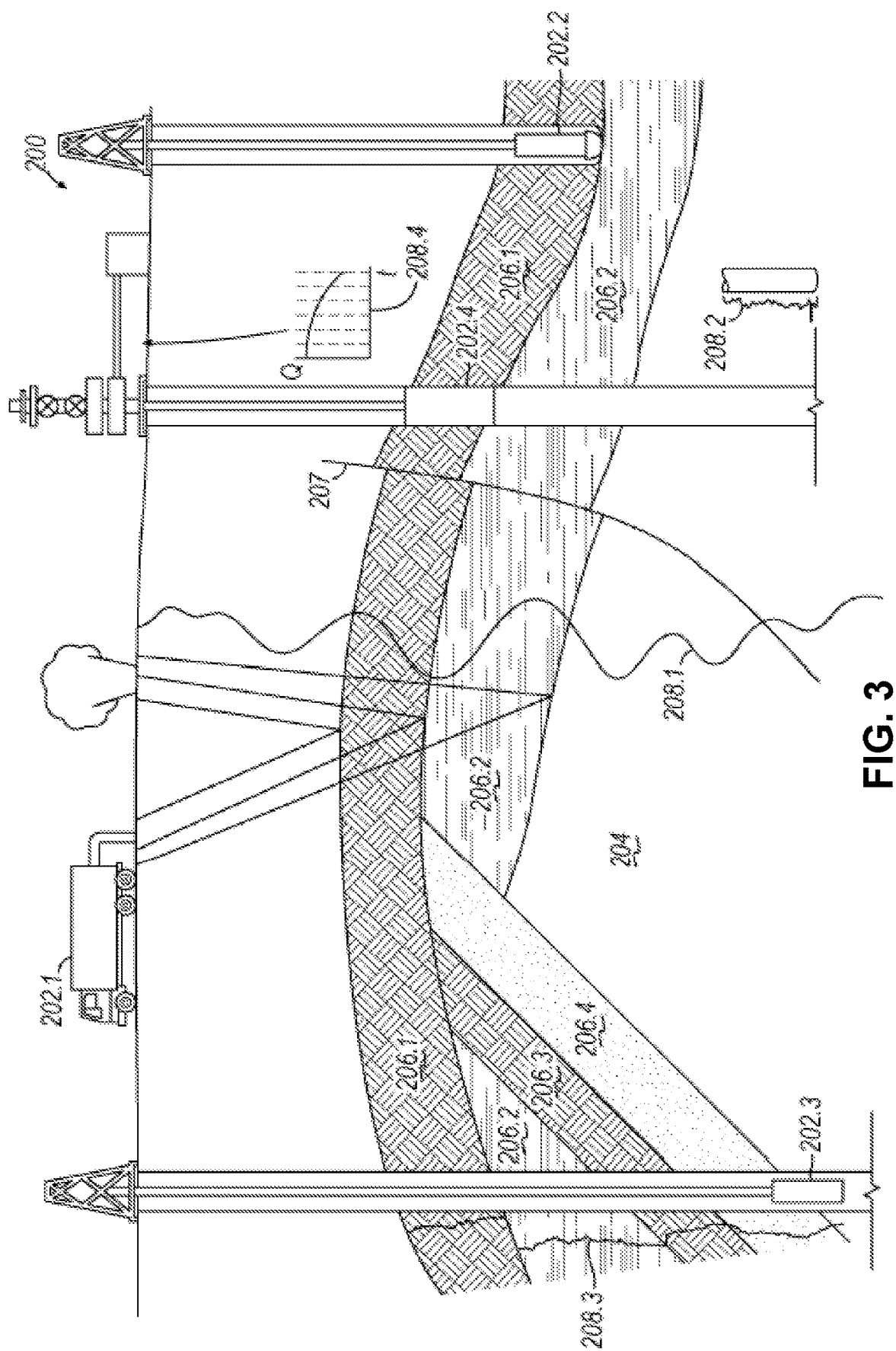
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. The static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
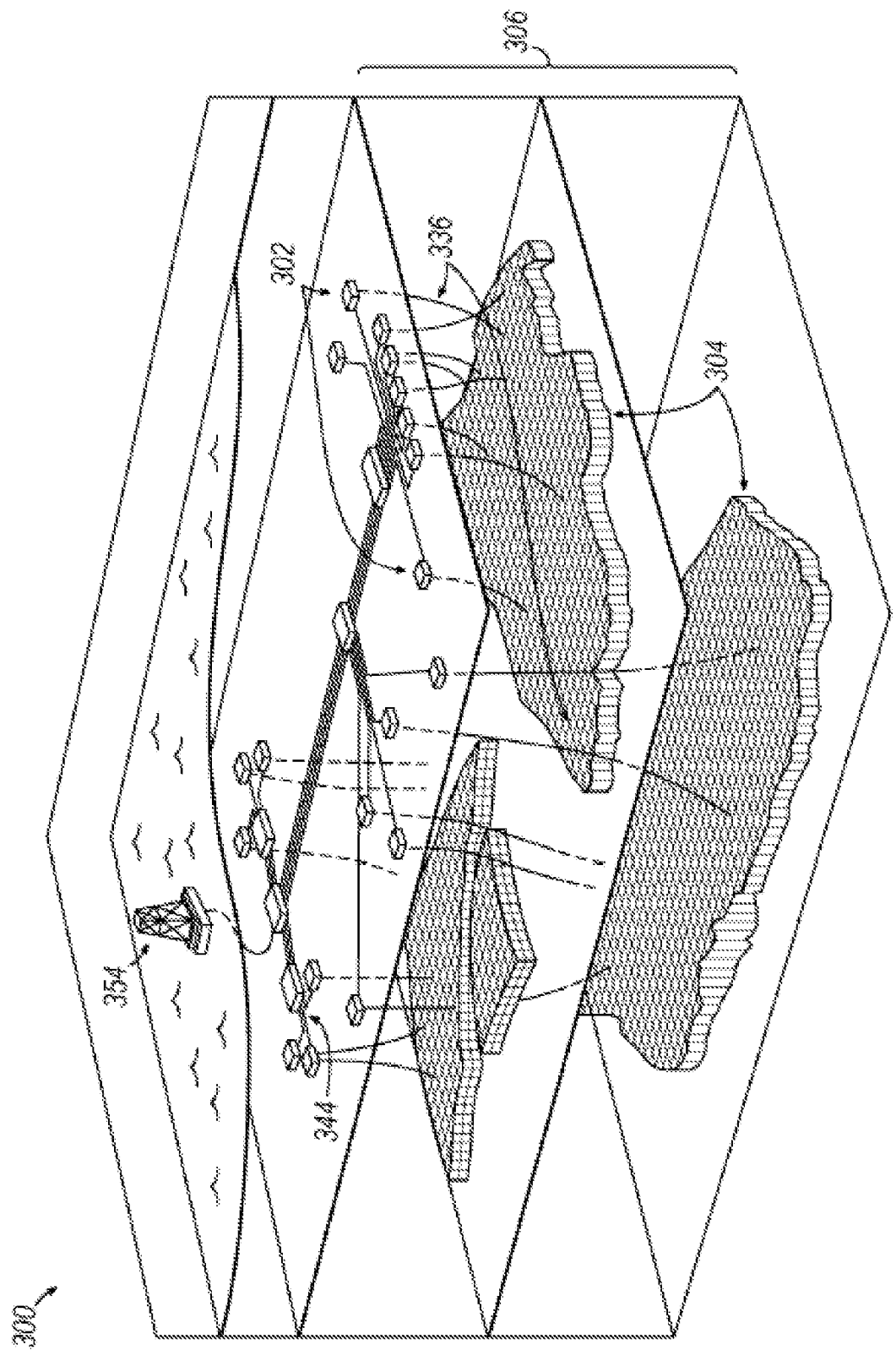
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Petrophysical Field Evaluation Using Self-Organized Map

Evaluation of an oilfield, e.g., to identify locations and/or amounts of recoverable hydrocarbons, to develop well paths and field development plans, etc., may be performed with the assistance of various types of petrotechnical software. For example, the TECHLOG wellbore software platform available from Schlumberger, Ltd. and its affiliates provides a number of computer-implemented tools for interpreting well logs and other well measurements collected from the wells in a field for the purpose of performing petrophysical field evaluations.

Generally, with such computer-implemented tools, projects may be created including collections of well measurements of a field, referred to hereinafter as collected datasets. Some fields, however, may include hundreds or thousands of wells, and each well may have tens of thousands of collected well measurements, e.g., arranged into samples of one or more types of measurements collected at particular depths or locations along a wellbore. The well measurements may be collected in the form of well logs, and may be collected using logging while drilling (LWD), measurement while drilling (MWD) and other wireline or in-well collection techniques. The types of measurements that may be collected include, but are not limited to, natural gamma ray, density and photoelectric index, neutron porosity, borehole caliper, resistivity, sonic, imaging, formation pressure, formation sampling, nuclear magnetic resonance, seismic, etc., and it will be appreciated that evaluations may also incorporate additional data such as field seismic data, fault networks, fluid composition data, etc.

Given the volume of data associated with some fields, it can be difficult to obtain a global view of a field and retrieve relevant information. A petrophysicist may perform an evaluation first by analyzing several wells of a field, and then creating clusters with coherent log responses that they may then propagate to other wells in the field using statistical clustering techniques such as K-Mean. Petrophysical models, for example, may be created for each cluster and propagated to all of the wells. The petrophysical properties propagated in the field may then be gathered to estimate hydrocarbon columns (i.e., hydrocarbon at the wellbore). The models may also be used with other software tools such as reservoir simulators to compute reservoir information such as oil in place. With such approaches, however, a petrophysicist may not be confident that the information extracted from several wells is enough to represent all of the field characteristics and if the propagation may be valid.

In contrast, embodiments of the invention may support workflows that facilitate the generation and/or display of models and other evaluation information associated with the petrophysical properties of a field in part based upon the use of a self-organized map (SOM). Such workflows, in particular, may effectively generate a synthetic dataset incorporating synthetic samples that reduce a collected dataset using a self-organized map, such that petrophysical evaluation may be performed on synthetic samples and then propagated back to the wells in the field. In some embodiments, for example, a dataset including well measurements collected from a plurality of wells in a field may be received, a synthetic dataset may be generated from the received dataset by computing a plurality of synthetic samples from the received dataset using a self-organized map (SOM), and the one or more models generated from the synthetic dataset may be propagated to the plurality of wells.

Figure 5:
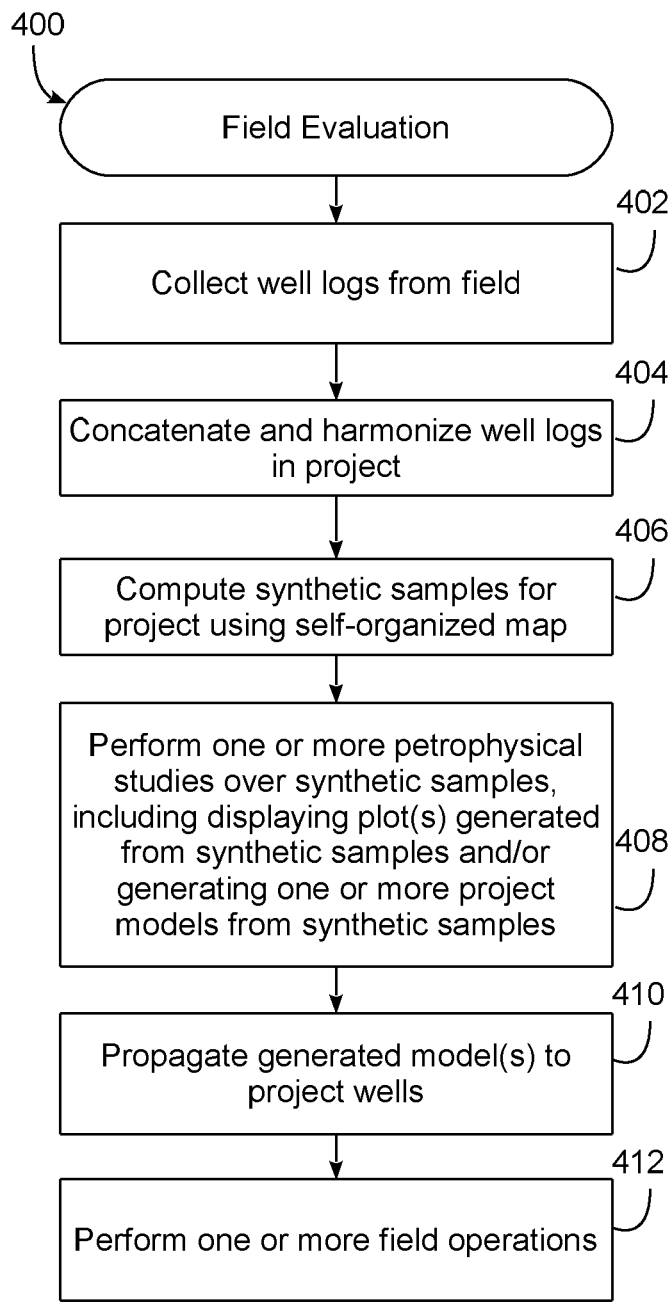
FIG. 5 is a flowchart illustrating an example sequence of operations for performing a field evaluation using the data processing system of FIG. 1.

FIG. 5, for example, illustrates a sequence of operations 400 that may be performed to evaluate a field consistent with some embodiments of the invention, and implemented, for example, using data processing system 10 of FIG. 1. In this example sequence of operations, the field evaluation is performed as part of a project that is associated with a field under evaluation and that contains the well logs and other data associated with the field and used in connection with performing the evaluation.

First, in block 402, well logs, representing a dataset of well measurements that may include, for example, samples and/or other data associated with the project, are collected and/or received. Next, in block 404, the well logs in the project are concatenated and harmonized. Samples may be extracted from the well logs and concatenated by reading the available data in order to learn the self-organized map, and harmonization, or normalization, may include compensating the log measurements for one or more conditions, including inaccurate tool calibration, "drift" in the measuring devices, differences in tool response resulting from differences in vendors, vintages, and tool types, differences in rock and fluid properties, the relative angle between borehole and formation, anisotropy, etc. In addition, environment correction may also be applied.

Next, in block 406, a self-organized map is used to generate a synthetic dataset including synthetic samples computed from the collected and/or received dataset. The synthetic dataset may be generated, for example, using a Kohonen network, or using other self-organized map techniques that will be appreciated by those of ordinary skill having the benefit of the instant disclosure, e.g., a kde algorithm, segmentation, etc. As a result of block 406, a synthetic dataset is generated including a plurality of synthetic samples that together represent a reduced dataset that substantially reduces the number of samples as compared to the collected dataset, while conserving the topology of the input space. In some embodiments, for example, a synthetic dataset may include about 2500-10,000 synthetic samples generated from a collected dataset including greater than a million samples. In addition, in some embodiments, the generation of the synthetic dataset may include saving the synthetic sample as a codebook in a software tool, e.g., as a composite well in the TECHLOG wellbore software platform.

Next, in block 408, one or more petrophysical studies may be performed over the synthetic samples in the synthetic dataset, and in connection with performing such studies, one or more project models may be generated from the synthetic samples and/or one or more plots or other information displays may be generated and/or otherwise presented to a petrophysicist for evaluation. The performance of studies, the generation of models and the display of information may be similar in many respects to comparable operations performed in petrophysical evaluations based upon collected well measurements, but instead performed based upon the synthetic dataset. Nonetheless, because the synthetic dataset is substantially smaller in size that the collected and/or received dataset, evaluations may be performed with substantially less computing resources, time and/or effort, and in some instances enabling more computationally-intensive algorithms (e.g., Monte Carlo simulation, multicomponent inversion Elemental Log Analysis (ELAN), etc.) to be used in instances where performing such algorithms on a complete collected dataset is impractical.

Various properties or models, e.g., saturation, porosity, permeability, lithology models representing the lithology of a subsurface formation, etc., may be generated based upon the synthetic dataset. Furthermore, various information displays may be generated, e.g., displays of various synthetic logs representing any of the aforementioned types of measurements from the collected dataset but based upon the synthetic dataset, including, for example, volume of shale, saturation porosity, and permeability for quick assessment to help future summary cut-off decisions, etc.

Next, in block 410, the model or models generated in block 408 based upon the synthetic dataset may be propagated to some or all of the wells in the project, i.e., such that wells in the project are assigned or otherwise associated with models generated from the synthetic dataset.

Next, in block 412, one or more field operations may be performed based upon the results of the petrophysical studies. For example, field operations may include operations such as drilling a well, determining a field development plan, configuring a surface network, controlling a production and/or injection well, etc., and may include various additional operations performed during any of exploration, appraisal, development and production phases for a field. It will be appreciated, however, that field operations need not be performed in some embodiments within data processing system 10 or otherwise at the time that a field evaluation and/or petrophysical study is performed. In some instances, for example, a field operation may be performed much later in time and/or even by a different entity from that conducting the field evaluation.

Figure 6:
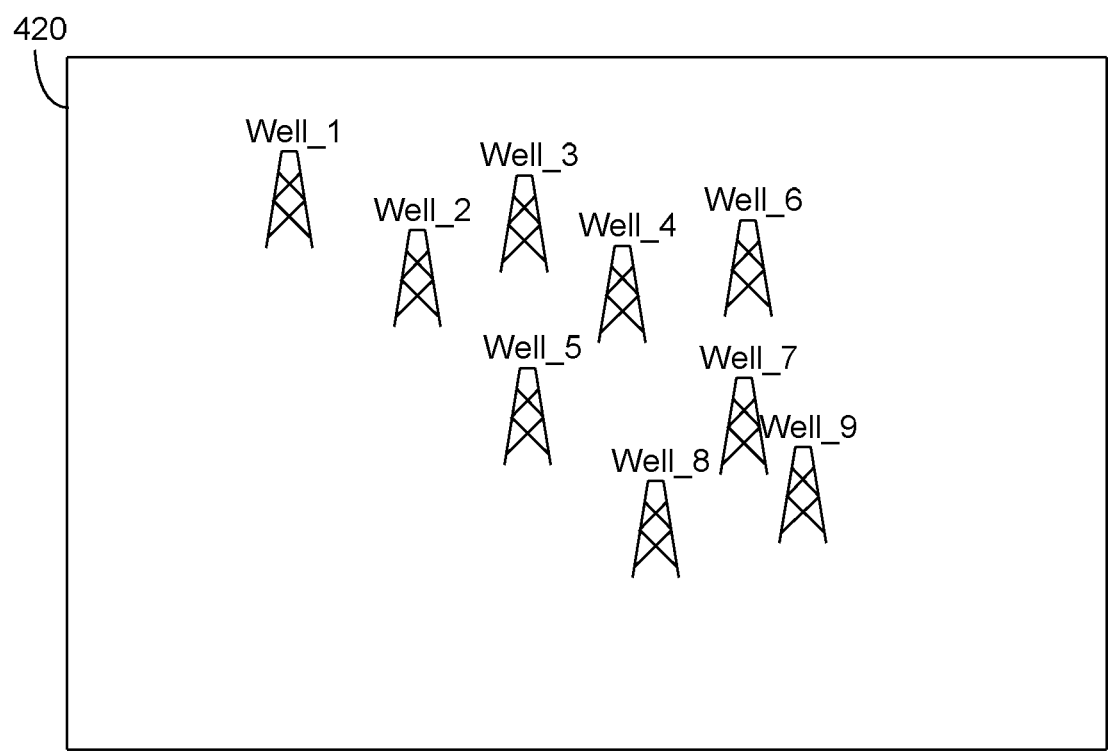
FIG. 6 illustrates a field map of wells in an example field.
Figure 7:
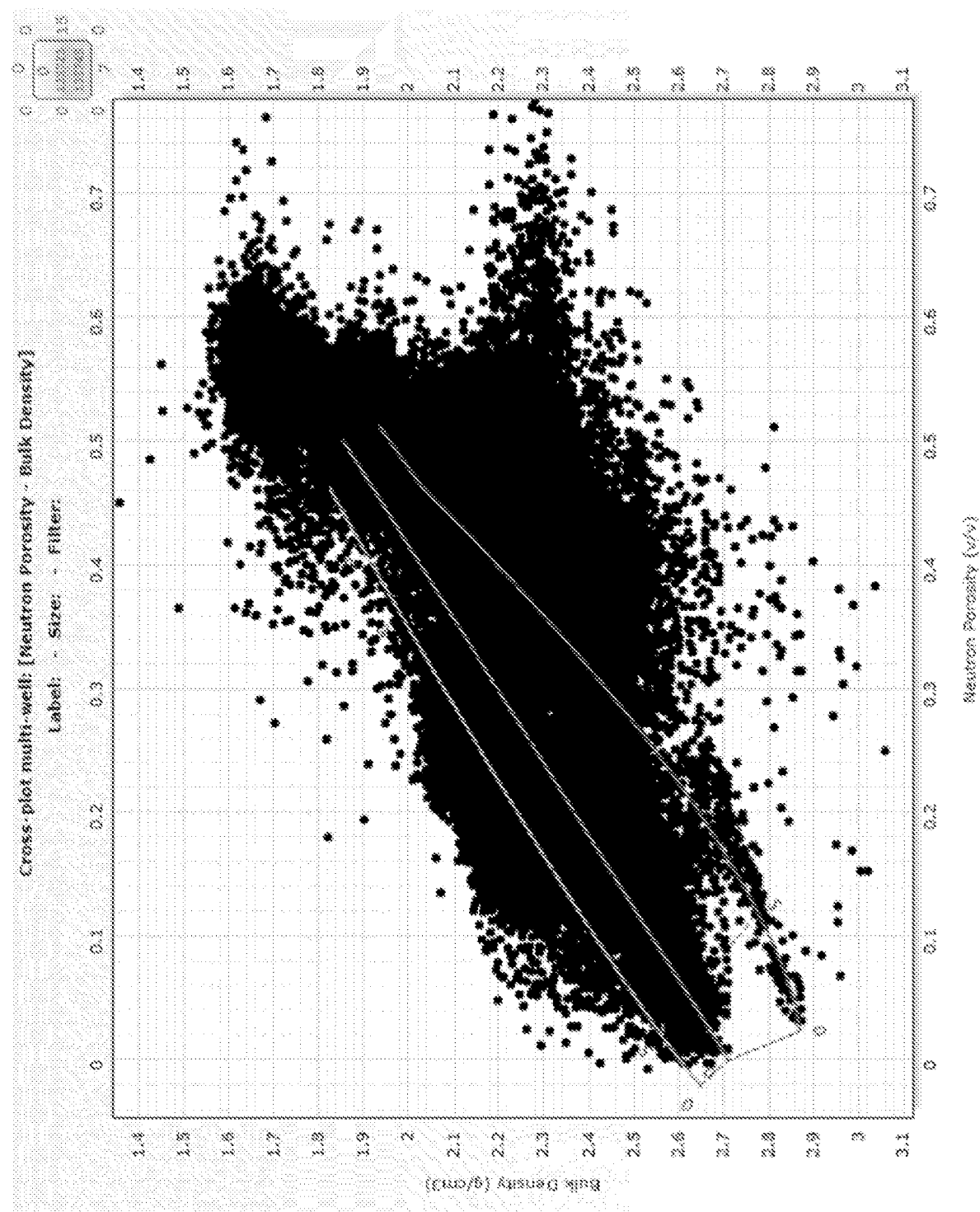
FIG. 7 illustrates an example cross plot of neutron porosity and bulk density measurements from a pair of measurements collected from an example field, and including an excess of 100,000 samples.
Figure 8:
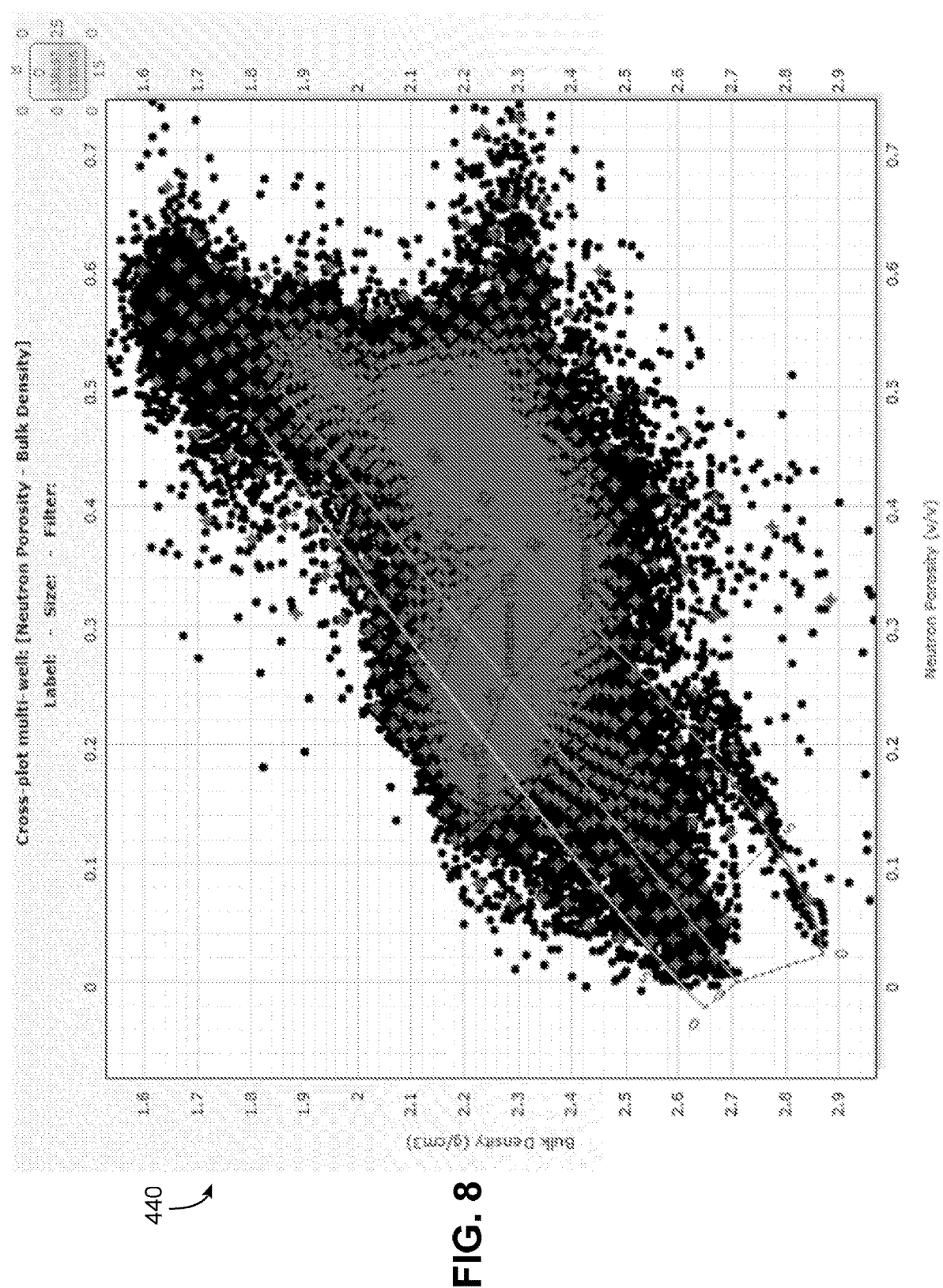
FIG. 8 illustrates the example cross plot of FIG. 7 overlaid with a reduced set of about 2500 synthetic samples generated using the sequence of operations of FIG. 5.

Now turning to FIGS. 6-8, these figures graphically represent the generation of a synthetic dataset using sequence of operations 400. FIG. 6, for example, illustrates a representative well map 420 for a field, illustrating the locations of wells within a field under study. The collected dataset for these wells, consistent with the invention, may be concatenated and harmonized as discussed above in block 404, and FIG. 7 illustrates an example cross plot 430 of two measurements (bulk density and neutron porosity), and including a large set of samples, each represented by a black dot), to illustrate the relatively large size of the collected dataset. FIG. 8, in turn, illustrates an example cross plot 440 of the same two measurements as cross plot 430, but with synthetic samples from a synthetic dataset overlaid and represented by gray diamonds. The synthetic samples may be represented, as noted above, by a synthetic codebook, and may be generated using a self-organized map. As a result, the dataset for the field may be represented by about 2500 synthetic samples.

Figure 9:
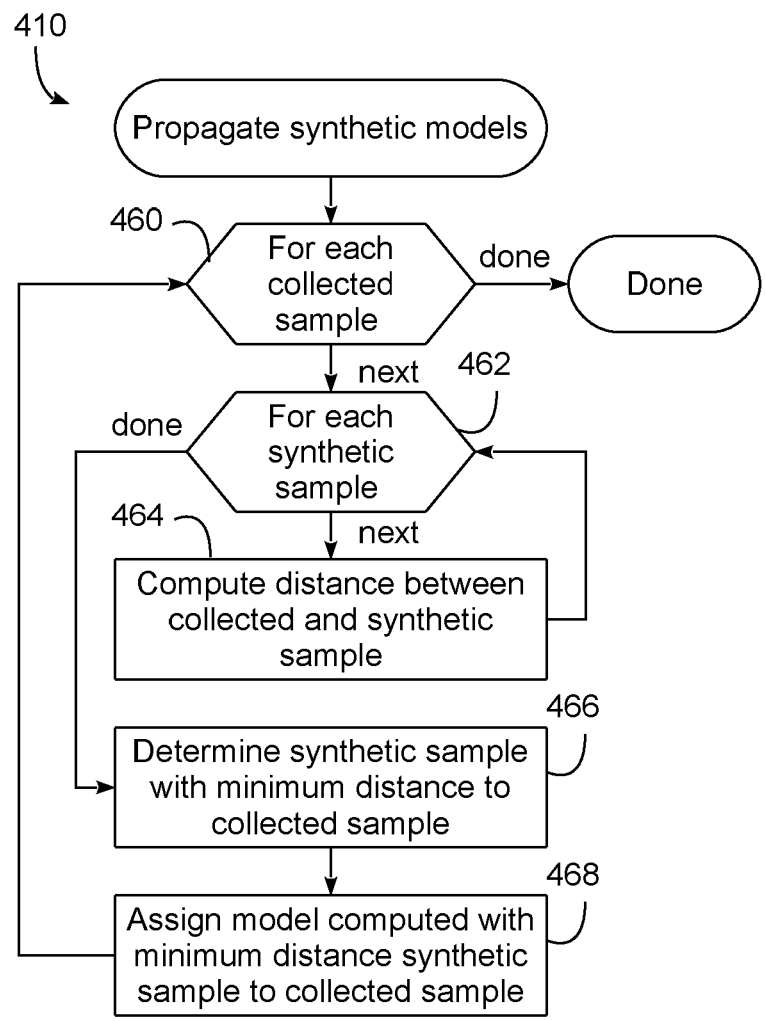
FIG. 9 is a flowchart illustrating an example sequence of operations for propagating synthetic models using the data processing system of FIG. 1.

Now turning to FIG. 9, one example sequence of operations is illustrated for propagating synthetic models to the wells in a field, e.g., as represented by block 410 of FIG. 5. While other implementations may be used to propagate models generated from a synthetic dataset to wells in a field, in the illustrated embodiment the propagation may utilize an algorithm that assigns models associated with synthetic samples to wells based upon minimum distances.

For example, in one embodiment, for each sample of the field, a synthetic sample of the self-organized map may be found having a minimum distance using the equation:

$$Winner_{node} = \text{argmin}_{node \in som} \sum_{i=1}^{m} (fieldvector_i - node_i)^2$$

where the node is the synthetic sample of the self-organized map and m is the dimension of the node vector, i.e., the number of logs used. In some embodiments, one may take the average value of the property of all the nodes of the self-organized map weighted by the distance described in the equation above. Whichever synthetic sample is determined to have the minimum distance, the model computed with that synthetic sample may then be assigned to the collected sample of the field.

As shown in FIG. 9, for example, a pair of nested FOR loops 460, 462 may be performed to process each collected sample and each synthetic sample. For each such pair, block 464 may compute the distance between the collected and synthetic samples as described above, and once all distances have been calculated, block 466 may determine the synthetic sample with the minimum distance to the collected sample, and block 468 may assign the model computed with the minimum distance synthetic sample to the collected sample. This process is then repeated for each additional collected sample in the collected dataset. In some embodiments, as noted above, rather than taking the node with the minimum distance, average values for all of the nodes may be computed.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method, comprising:
receiving a dataset of a number of actual samples that include well measurements collected from a plurality of wells in a field and that define an input space topology;
using at least one processing unit, generating a synthetic dataset from the received dataset by computing a number of synthetic samples from the received dataset using a self-organized map (SOM), wherein the number of synthetic samples is less than the number of actual samples and wherein the synthetic samples conserve the input space topology;
generating one or more models using at least a portion of the synthetic samples;
for one of the actual samples that corresponds to one of the plurality of wells, finding a corresponding one of the synthetic samples; and
propagating one of the one or more models generated at least in part from the one of the synthetic samples to the one of the plurality of wells.

2. The method of claim 1, comprising performing one or more petrophysical studies using at least a portion of the synthetic dataset, wherein the one or more models are generated during performance of the one or more petrophysical studies.

3. The method of claim 2, further comprising generating one or more plots from the synthetic dataset during performance of the one or more petrophysical studies.

4. The method of claim 1, further comprising concatenating the well measurements from the received dataset before generating the synthetic dataset.

5. The method of claim 1, further comprising harmonizing the well measurements from the received dataset before generating the synthetic dataset.

6. The method of claim 1, comprising performing one or more field operations using at least the one propagated model.

7. The method of claim 1, wherein the finding comprises using a proximity distance between the one of the actual samples and the corresponding one of the synthetic samples.

8. An apparatus, comprising:
at least one processing unit; and
program code configured upon execution by the at least one processing unit to:
receive a dataset of a number of actual samples that include well measurements collected from a plurality of wells in a field and that define an input space topology,
generate a synthetic dataset from the received dataset by computing a number of synthetic samples from the received dataset using a self-organized map (SOM), wherein the number of synthetic samples is less than the number of actual samples and wherein the synthetic samples conserve the input space topology,
generate one or more models using at least a portion of the synthetic samples,
for one of the actual samples that corresponds to one of the plurality of wells, find a corresponding one of the synthetic samples, and
propagate one of the one or more models generated at least in part from the one of the synthetic samples to the one of the plurality of wells.

9. The apparatus of claim 8, wherein the program code is further configured to perform one or more petrophysical studies using at least a portion of the synthetic dataset, wherein the one or more models are generated during performance of the one or more petrophysical studies.

10. The apparatus of claim 9, wherein the program code is further configured to generate one or more plots from the synthetic dataset during performance of the one or more petrophysical studies.

11. The apparatus of claim 8, wherein the program code is further configured to concatenate the well measurements from the received dataset before generating the synthetic dataset.

12. The apparatus of claim 8, wherein the program code is further configured to harmonize the well measurements from the received dataset before generating the synthetic dataset.

13. The apparatus of claim 8, wherein the program code is further configured to perform one or more field operations using at least the one propagated model.

14. The apparatus of claim 8, wherein the program code is configured to find by using a proximity distance between the one of the actual samples and the corresponding one of the synthetic samples.

15. A program product, comprising:
a non-transitory computer readable medium; and
program code stored on the computer readable medium and configured upon execution by at least one processing unit to:
receive a dataset of a number of actual samples that include well measurements collected from a plurality of wells in a field and that define an input space topology,
generate a synthetic dataset from the received dataset by computing a number of synthetic samples from the received dataset using a self-organized map (SOM), wherein the number of synthetic samples is less than the number of actual samples and wherein the synthetic samples conserve the input space topology,
generate one or more models using at least a portion of the synthetic samples,
for one of the actual samples that corresponds to one of the plurality of wells, find a corresponding one of the synthetic samples, and
propagate one of the one or more models generated at least in part from the one of the synthetic samples to the one of the plurality of wells.

16. The program product of claim 15, wherein the program code is configured to perform one or more petrophysical studies using at least a portion of the synthetic dataset, wherein the one or more models are generated during performance of the one or more petrophysical studies.

17. The program product of claim 15, wherein the program code is further configured to concatenate and harmonize the well measurements from the received dataset before generating the synthetic dataset.

18. The program product of claim 15, wherein the program code is configured to find by using a proximity distance between the one of the actual samples and the corresponding one of the synthetic samples.

* * * * *